J. A. BORLAND.
TIRE.
APPLICATION FILED FEB. 10, 1913.
1,147,600.
Patented July 20, 1915.
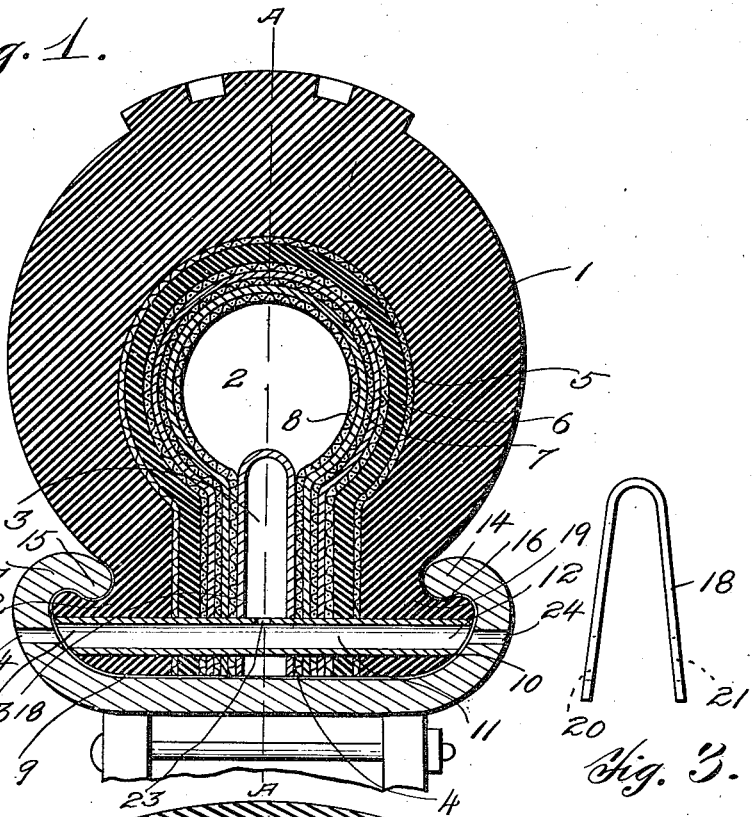
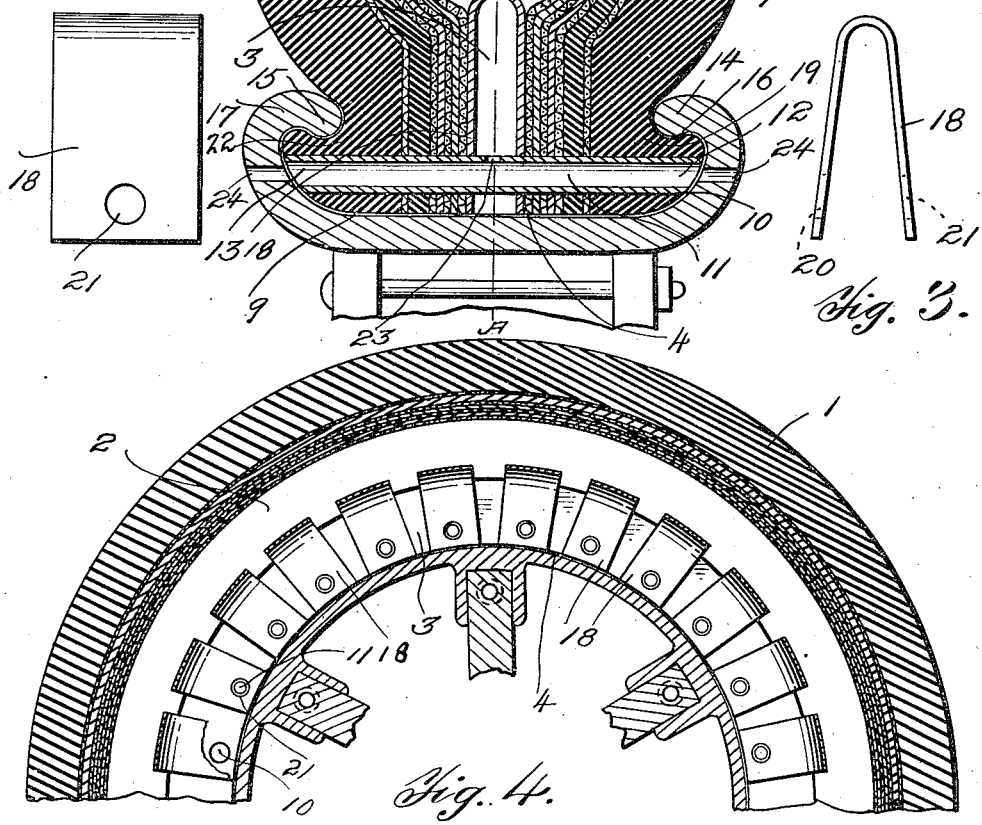
WITNESSES
M. P. McKee
R. Kilick
INVENTOR
J. A. Borland
Alex. J. Wedderburn, Jr.
Attorney

UNITED STATES PATENT OFFICE.

JOHN ARCHIE BORLAND, OF CINCINNATI, OHIO, ASSIGNOR OF ONE-HALF TO POWEL CROSLEY, OF CINCINNATI, OHIO.

TIRE.

1,147,600.  Specification of Letters Patent.  Patented July 20, 1915.

Application filed February 10, 1913. Serial No. 747,395.

*To all whom it may concern:*

Be it known that I, JOHN ARCHIE BORLAND, a citizen of the United States, residing at Cincinnati, in the county of Hamilton and State of Ohio, have invented certain new and useful Improvements in Tires, of which the following is a specification.

This invention relates to improvements in tires for wheels and has for its object to provide a tire having means whereby it may be fixedly secured to a wheel rim.

Another object of the invention is to provide a semi-solid rubber tire having a centrally disposed stiffening or reinforcing whereby the tire may more readily be held in fixed position relative to a wheel rim.

Still another object of the invention is to provide a tire having a cored out center and means whereby heated and expanded air in said core may escape.

With the above and other objects in view which will be more fully explained in the following specification, I have invented the device illustrated in the accompanying drawings in which—

Figure 1 is a transverse sectional view of a tire and wheel rim, Fig. 2 is a side elevation of a spreader member, Fig. 3 is an edge view of said member, and Fig. 4 is a sectional view taken on line A—A of Fig. 1.

Like reference characters indicate like parts throughout the following specification and in the several views in the drawings, in which 1 is a tire, formed preferably of rubber, but which may be made of any other suitable material, having its entire annular central portion cored out to form the bore 2, and having an annular channel 3 leading from said bore to the inner surface 4 of the tire.

Embedded in the inner portion of the tire adjacent the bore 2 and channel 3 and conforming to the contour of the walls thereof are a series of stiffening members 5, 6, 7 and 8 which are constructed preferably of a very stiff heavy canvas having the material from which the tire is chiefly made interspersed therebetween.

The base 9 of the tire is provided with a series of annularly disposed openings 10 extending entirely thereacross, in which metal tubes 11 are seated, the ends 12 and 13 of which project inwardly of the edges 14 and 15 of the rim flanges 16 and 17 whereby it is impossible for the tire to become accidentally disconnected from the rim.

Located in the channel 3 are a series of spring spreader members 18 having openings 20 and 21 for accommodation of the tubes 11. These spreading members normally force the flanges 19 and 22 apart whereby said parts are held seated against the flanges of the rim. The tubes 11 are provided with openings 23 whereby there may be a free passage of air in and from the bore 2 in the tire. If necessary openings 24 may be provided in the flange 17 adjacent the tubes 11 whereby air may pass from the tire.

While this tire is designed especially for racing and other rapid running automobiles where friction will cause the expansion of air in the bore 2 and ordinarily would cause such an expansion of the air, a bursting of the tire would often occur and the great strain in taking curves would often cause the tire to become loosened from the wheel rim, yet it is equally adaptable for pleasure cars and especially for heavy trucks where a very strong and durable tire is required, the stiffening of the center of the tire making it quite as dense as a solid tire would be, while its weight is greatly lessened and its cost reduced, as much less rubber is required for its construction.

Having now described my invention that which I claim to be new and desire to procure by Letters Patent is:

1. The combination with a resilient tire having a vertical channel and spaced apart sides, a rim, and U-shaped spreader members adapted to force said sides into engagement with said rim, and flanges on said sides having opposing openings therein, said rim having opposing openings, and tubes projecting through the openings in said flanges and engaging said rim.

2. In combination with a resilient tire having a vertical channel and spaced apart sides, a rim, and U-shaped spreader members adapted to force said sides into engagement with said rim, and flanges in said sides having opposing openings therein, said rim having opposing openings, and tubes projecting through the openings in said flanges and engaging said rim, said spreader members being resilient.

3. In combination with a resilient tire having a vertical channel and spaced apart sides, a rim, and U-shaped spreader members adapted to force said sides into engagement with said rim, flanges in said sides having opposing openings therein, said rim having opposing openings, and tubes projecting through the openings in said flanges and engaging said rim, said spreader members being resilient, and mounted upon said tubes.

4. In combination with a resilient tire having a central channel and spaced apart sides, flanges on said sides, a rim having opposing inturned edges adapted to engage said flanges, spreader members adapted to hold said flanges in engagement with said edges, said flanges having opposing openings therein, and tubes having central openings seated in said first openings and of a length to be held within said edges, said tubes alining with openings in said rim, said spreader members mounted upon said tubes, said spreader members consisting of U-shaped members having alining openings in their opposing ends whereby they are mounted upon said tubes.

5. In combination with a resilient tire having a vertical channel and spaced apart sides, a rim, and U-shaped spreader members adapted to force said sides into engagement with said rim, flanges in said sides having opposing openings therein, said rim having opposing openings, and tubes projecting through the openings in said flanges and engaging said rim, said spreader members being resilient, and mounted upon said tubes, said tubes alining with the openings in said rim.

6. In combination with a resilient tire having a vertical channel and spaced apart sides, a rim, and U-shaped spreader members adapted to force said sides into engagement with said rim, flanges in said sides having opposing openings therein, said rim having opposing openings, tubes projecting through the openings in said flanges and engaging said rim, said spreader members being resilient, and mounted upon said tubes, said tubes alining with the openings in said rim, said tubes having a central opening.

In testimony whereof I affix my signature in presence of two witnesses.

JOHN ARCHIE BORLAND.

Witnesses:
EARLE R. PASSEL,
GEORGE C. SCHMITT, Jr.